United States Patent [19]
Seino

[11] Patent Number: 6,081,500
[45] Date of Patent: *Jun. 27, 2000

[54] HEAD FEEDING APPARATUS

[75] Inventor: Takashi Seino, Tokyo, Japan

[73] Assignee: Sony Corporation, Tokyo, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/840,182

[22] Filed: Apr. 11, 1997

[30] Foreign Application Priority Data

Apr. 19, 1996 [JP] Japan .................................. 8-098952

[51] Int. Cl.⁷ .................................................. G11B 21/02
[52] U.S. Cl. ........................... 369/215; 369/219; 369/249
[58] Field of Search ..................................... 369/215, 219, 369/220, 244, 249, 258; 360/106, 109

[56] References Cited

U.S. PATENT DOCUMENTS

| | | | |
|---|---|---|---|
| 5,303,104 | 4/1994 | Argua et al. | 360/106 |
| 5,307,339 | 4/1994 | Tanaka | 369/215 |
| 5,357,500 | 10/1994 | Yanagisawa | 369/215 |
| 5,696,753 | 12/1997 | Okushita | 369/215 |

FOREIGN PATENT DOCUMENTS

| | | |
|---|---|---|
| 5-234281 | 9/1993 | Japan . |
| 5-250821 | 9/1993 | Japan . |
| 5-325202 | 12/1993 | Japan . |
| 7-151202 | 6/1995 | Japan . |
| 8-077731 | 3/1996 | Japan . |
| 9-063213 | 3/1997 | Japan . |

*Primary Examiner*—William Klimowicz
*Attorney, Agent, or Firm*—Limbach & Limbach L.L.P.

[57] ABSTRACT

A head feeding apparatus for recording information signals in a disk shaped recording medium such as an optical disk or reading the signals recorded therein comprises a guide mechanism and a moving mechanism. The guide mechanism guides the head in a direction of the diameter of the disk shaped recording medium. The moving mechanism moves the head along the guide mechanism. The moving mechanism comprises a driving source, a rack and a transmission mechanism. The rack is moved together with the head. The transmission mechanism meshes with the rack to transmit a driving force from the driving source. The rack is provided with elastic deformation sections for urging the gear section of the rack toward the transmission mechanism.

29 Claims, 5 Drawing Sheets

HEAD FEEDING APPARATUS

BACKGROUND OF THE INVENTION

1. Field of the Invention

This invention relates to a head feeding apparatus and more particularly to a head feeding apparatus which moves a head for recording and/or reproduction in a direction of a diameter of a disk shaped recording medium by utilizing gears.

2. Description of the Prior Art

According to conventional art, an optical pickup device which is a recording and/or reproducing head is moved by a feeding apparatus in a direction of the diameter of a disk shaped recording medium such as an optical disk or optical magnetic disk at the time of recording or reproduction. This optical pickup device includes an optical pickup for reproducing information signals recorded in an information signal area of an optical disk and a base which carries the optical pickup and is movably supported.

The base is formed in a substantially rectangular shape and large enough for carrying the optical pickup. This base has guide shaft bearing portions in which a guide shaft described later passes through, the guide shaft bearing portions being disposed on both sides of the base and in a direction of the diameter of the optical disk.

A feeding apparatus for feeding this optical pickup device in the direction of the diameter of the optical disk includes a pair of the guide shafts for guiding the optical pickup device in the direction of the diameter of the optical disk and a moving mechanism for moving the optical pickup device in the direction of the diameter of the optical disk.

The pair of guide shafts are mounted on guide walls of the chassis such that they are apart from each other in parallel condition. Guide shaft bearing portions provided on the base of the optical pickup device pass through the pair of guide shafts. As a result, the optical pickup device is supported such that it is freely movable in a direction of the diameter of the disk.

The moving mechanism includes a rack mounted on one side of the base of the optical pickup device and a transmission mechanism which meshes with the rack to transmit a driving force from a driving motor.

The rack is formed in a rectangular shape having a vertically longer side extending in a direction of the diameter of the optical disk. The rack has a gear section along its moving direction, which is provided on one side thereof. The rack is moved together with the optical pickup device in the direction of the diameter of the optical disk.

Figure 1:
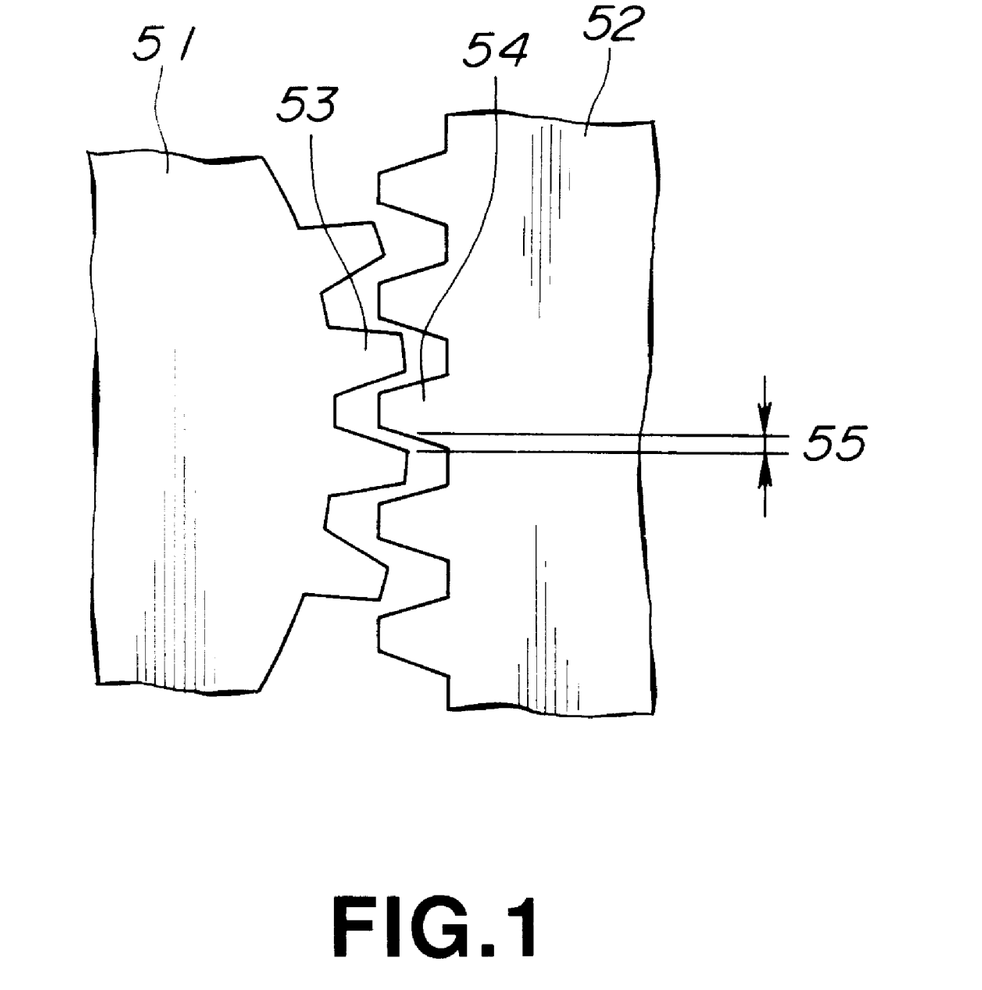
FIG. 1 is a view showing a state of engagement between a transmission gear and a rack of a feeding apparatus for an optical pickup device according to the present invention.

As shown in FIG. 1, the transmission mechanism includes a first transmission gear 51 which meshes with a gear 54 of the rack 52 to move the rack 52, a second gear (not shown) which meshes with the first transmission gear 51 to rotate the first transmission gear 51 and a worm shaft (not shown) which meshes with the second transmission gear to rotate the second transmission gear. The worm shaft is fixed to a output shaft of a driving motor (not shown).

In the feeding apparatus for the optical pickup device having the above described structure, when moving the optical pickup device, the driving motor (not shown) is driven to rotate the worm shaft. This worm shaft rotates the second transmission gear (not shown). The second transmission gear rotates the first transmission gear 51. The rotated transmission gear 51 operates and moves the rack 52. If the rack 52 is operated, the optical pickup device is moved along a pair of the guide shafts. Depending on the rotation direction of the first transmission gear 51, the rack 52 moves the optical pickup device to the center of the optical disk or to the outermost peripheral portion thereof.

In the feeding apparatus for the optical pickup device described above, if the driving motor is driven suddenly, a sudden transmission force is applied to the rack 52 through the second transmission gear (not shown) and the first transmission gear 51 by a driving force of the driving motor. Because the rack 52 is fixed on the base of the optical pickup device, the optical pickup device is moved rapidly. Thus, conventional feeding apparatuses have a problem that the optical pickup device may strike the guide wall of the chassis.

Because the rack 52 is fixed to the base of the optical pickup device, when the rack 52 meshes with the first transmission gear 51 as shown in FIG. 1, there may occur a backlash 55 which is a gap along a pitch circle between the gear section 54 of the rack 52 and the teeth 53 of the first transmission gear 51. Thus, there is a problem that transmission efficiency may drop when the teeth 53 of the first transmission gear 51 applies a transmission force to the gear section 54 of the rack 52 in the feeding apparatus shown in FIG. 1.

If the optical pickup device is moved to the innermost peripheral portion or the outermost peripheral portion of the optical disk, it strikes the guide wall of the chassis and stops. At this time, because the rack 52 is fixed to the base of the optical pickup device, if a driving motor (not shown) continues to rotate, an excessive transmission force is applied to the rack 52 through the second transmission gear and the first transmission gear 51 by a driving force of the driving motor. As a result, in the feeding apparatus shown in FIG. 1, the gear section 54 of the rack 52, the teeth 53 of the first transmission gear 51 and the teeth of the second transmission gear may be damaged.

In the apparatus shown in FIG. 1, if the driving motor is stopped, the rack 52 is stopped through the second transmission gear and the first transmission gear 51. Because the rack 52 is fixed to the base of the optical pickup device, if an external force is applied to the optical pickup device, the rack 52 is about to be moved together with the optical pickup device. At this time, the gear section 54 of the rack 52 applies a load to the teeth 53 of the first gear. Consequently, the feeding apparatus shown in FIG. 1 has a problem that the gear section 54 of the rack 52, the teeth 53 of the first transmission gear 51 and the teeth of the second transmission gear may be damaged.

SUMMARY OF THE INVENTION

It is therefore an object of the present invention to provide a head feeding apparatus which resolves the above-described problem.

According to the present invention, there is provided a head feeding apparatus including a guide mechanism for guiding the head in a direction of the diameter of a disk shaped recording medium and a moving mechanism for moving the head along the guide mechanism, the moving mechanism including a driving source, a rack and a transmission mechanism, the rack being moved together with the head, the transmission mechanism engaging with the rack to transmit a driving force from the driving source, the rack containing an elastic deformation section for urging a gear section of the rack toward the transmission mechanism.

According to another aspect of the present invention, there is provided a head feeding apparatus including a base in which the head is mounted, a guide mechanism for guiding the base in a direction of the diameter of a disk shaped recording medium, and a moving mechanism for moving the head along the guide mechanism, the moving mechanism including a driving source, a rack and a transmission mechanism, the rack being mounted to the base and moved together with the head, the transmission mechanism containing transmission gears which engage with the gear section of the rack so as to transmit a driving force of the driving source to the rack, and the rack containing elastic deformation sections for urging the gear section of the rack toward the transmission gear.

DETAILED DESCRIPTION OF THE PREFERRED EMBODIMENTS

Hereinafter, embodiments of a head feeding apparatus according to the present invention will be described in detail with reference to the accompanying drawings. A head feeding apparatus according to an embodiment of the present invention will be described by taking as an example an optical pickup device of a CD-ROM disk reproducing device to be used as an external storage device of a computer.

Figure 2:
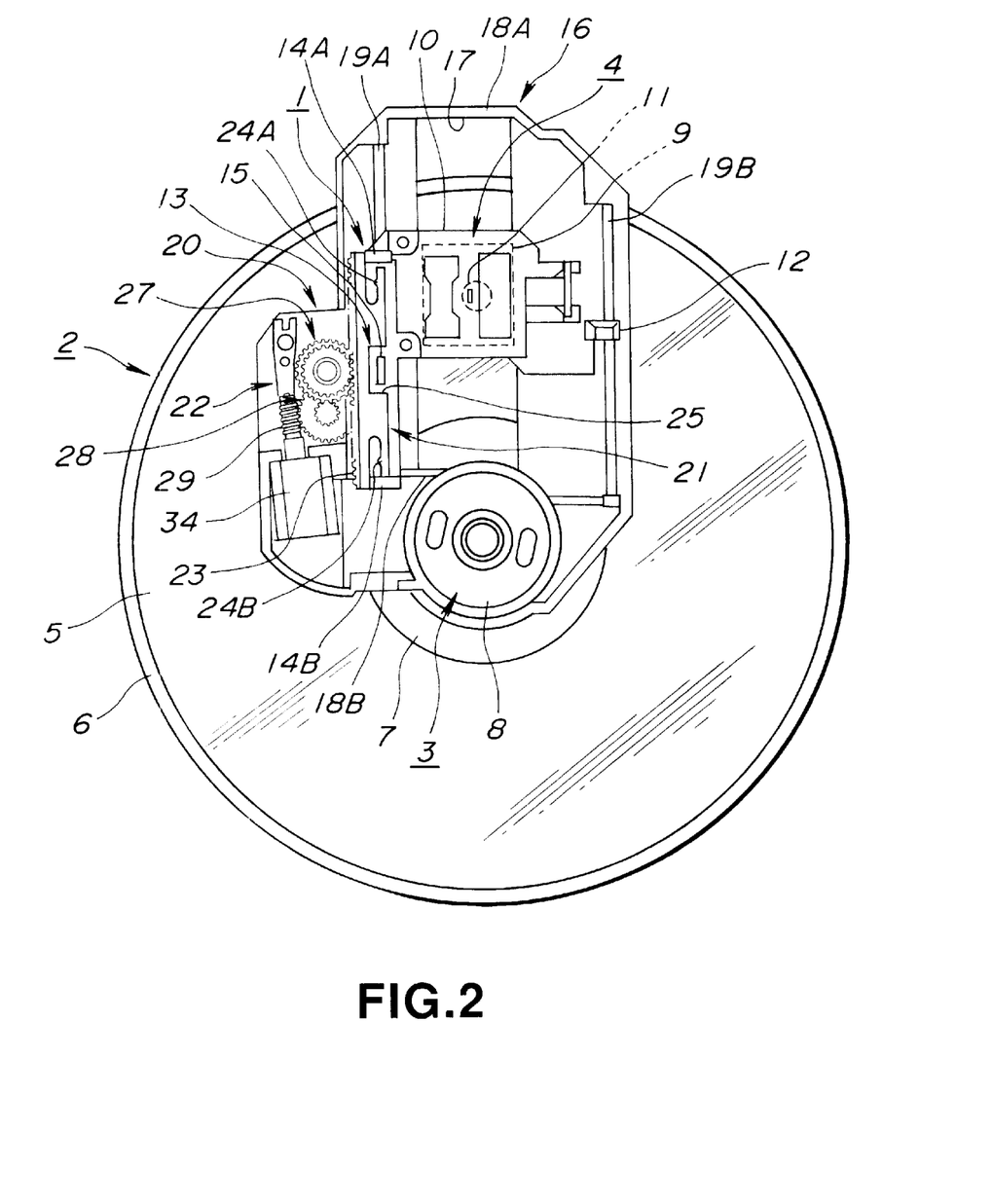
FIG. 2 is a plan view of the optical pickup device according to an embodiment of the present invention as viewed from its bottom side.

FIG. 2 shows a rear view of an apparatus utilizing an optical pickup device according to this embodiment of the present invention in which an optical disk 2 is loaded. The optical disk 2 which is a circular shaped recording medium is an optical disk dedicated for only reproduction in which CD-ROM disk data or the like is stored. The optical disk 2 includes a disk substrate capable of transmitting light, being made of polycarbonate or the like, an information signal layer composed of a metallic layer or the like plated on one side of the substrate and a protective layer for mechanically or chemically protecting the information signal layer, plated on the information signal layer. The optical disk 2 contains a signal recording area 5 and non-information signal recording areas which are provided on an innermost peripheral portion 7 which is a peripheral portion around a center hole of the optical disk 2 and an outermost peripheral portion 6. The non-information signal recording areas contain no information signals. The signal recording area 5 has unevenness in level based on information signals, that is, a plurality of pits.

The reproduction apparatus includes a disk rotating mechanism 3 for rotating the optical disk 2, an optical pickup device 4 for reading information signals stored in the optical disk 2 and a feeding apparatus 1 for feeding the optical pickup device 4.

The disk rotating mechanism 3 includes a disk table (not shown) on which the innermost peripheral portion 7 of the optical disk 2 is placed and a spindle motor 8 to whose rotating shaft the disk table is mounted. This disk table has a substantially cylindrical disk support (not shown) provided in the center of a disk mounting portion (not shown) in which the innermost peripheral portion of the optical disk 2 is placed such that it protrudes thereby engaging with a center hole of the optical disk 2. With respect to the disk rotating mechanism 3, if the spindle motor 8 is rotated, the disk table is rotated so that the optical disk 2 placed on the disk table is rotated at a constant speed.

The optical pickup device 4 includes an optical pickup 9 for reading information signals recorded in the signal area 5 of the optical disk 2 placed on the disk rotating mechanism 3 and a base 10 on which the optical pickup a is mounted.

The optical pickup 9 includes a semiconductor laser (not shown) for projecting a laser beam to the information signal layer of the optical disk 2 placed on the disk table of the disk rotating mechanism 3, an objective lens for focusing the laser beam projected from the semiconductor laser as shown in FIG. 2, an actuator mechanism for driving the objective lens 11 in a focusing direction and a tracking direction and a base on which the actuator mechanism is mounted. This optical pickup 9 further contains such optical parts as a half mirror, a beam splitter, a collimator lens and one or more optical detectors.

The base 10 is formed in a substantially rectangular shape large enough for mounting the optical pickup 9. A pair of guiding shaft bearing portions 12 are provided on each side of the base 10, the guiding shaft bearing portions 12 passing through respective guiding shafts disposed in the direction of the diameter of the optical disk 2 which will be described later. The base 10 is located on one side and provided with a mounting arm 13 which is of a substantially rectangular shape with a longer vertical side and formed to extend in the direction of the diameter of the optical disk 2. This mounting arm 13 contains supporting portions 14A, 14B which are located at both ends thereof along the diameter direction of the optical disk 2 and have through holes in the diameter direction of the optical disk 2. This mounting arm 13 has a guide protruding portion 15 having grooves which are engaged with a pair protruding pieces described later on both ends, the guide protruding portion being disposed in the center thereof in a direction of the diameter of the optical disk 2.

The feeding apparatus 1 of the optical pickup device is mounted on a chassis 16 on which the disk rotating mechanism 3 is installed as shown in FIG. 1. This chassis 16 has a guide opening portion 17 which is substantially rectangular and formed from near a spindle motor 8 of the disk rotating mechanism 3 along a direction of the diameter of the optical disk 2 placed on a disk table of the disk rotating mechanism 3. The guide opening portion 17 is formed in a length sufficient enough for securing a traveling amount of the optical pickup device 4 in the diameter direction of the optical disk 2. The chassis 16 has guide walls 18A, 18B provided in the back and forth along the diameter direction of the optical disk 2 in the guide opening portion 17.

Figure 3:
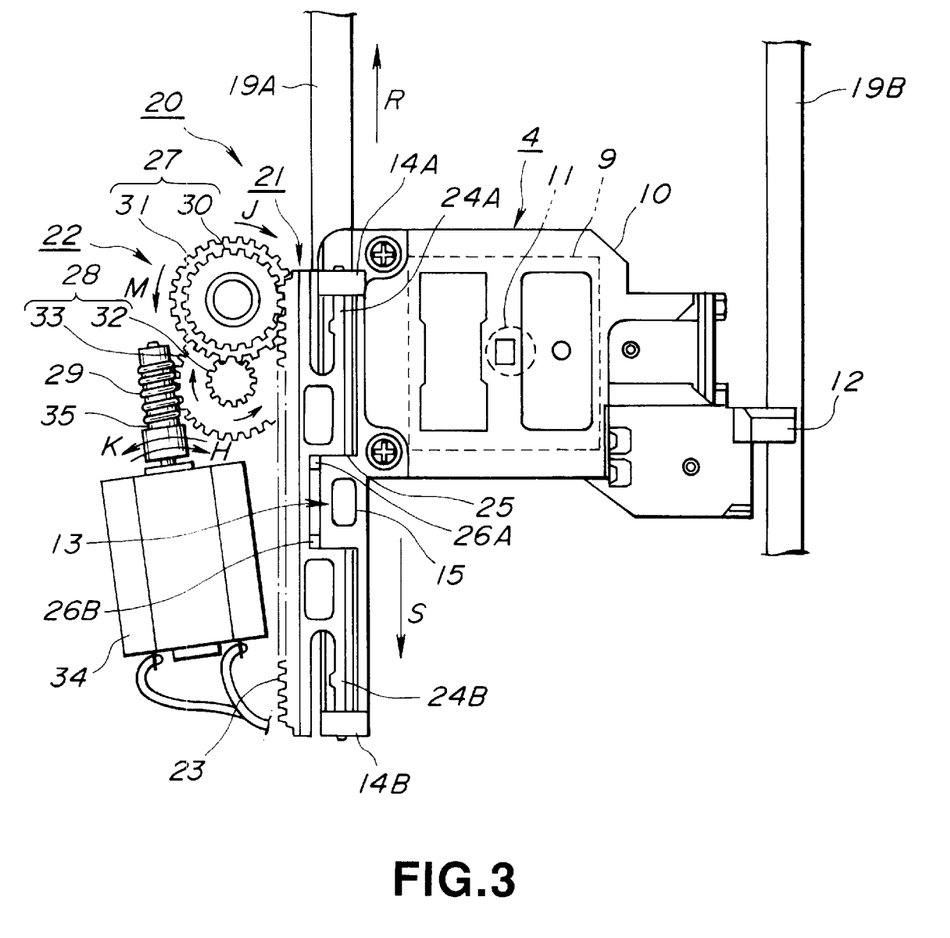
FIG. 3 is a plan view of major parts of the optical pickup device according to an embodiment of the present invention as viewed from the bottom side.

As shown in FIG. 3, the feeding apparatus 1 includes a pair of guide shafts 19A, 19B for guiding the optical pickup device 4 along the diameter direction of the optical disk 2 and a moving mechanism 20 for moving the optical pickup device 4 along the diameter direction of the optical disk 2.

The guide shaft bearing portions 12 mounted on the base 10 of the optical pickup device 4 pass through the pair of the guide shafts 19A, 19B. As a result, the optical pickup device 4 is supported movably along the diameter direction of the optical disk 2. Meanwhile, one guide shaft bearing portion of the pair of the guide shaft bearing portions 12 is not shown in FIG. 3 for a reason for representation. The pair of the guide shafts 19A, 19B are installed perpendicular to the guide walls 18A, 18B on the chassis 16 such that the guide shafts 19A, 19B are set apart from each other in parallel on both sides of the guide opening portion 17 of the chassis 16 along the diameter direction of the optical disk 2. The pair of the guide shafts 19A, 19B have a length sufficient enough for securing a moving amount of the optical pickup device 4.

The moving mechanism 20 includes a rack 21 which is installed on the base 10 in which the optical pickup device 4 is mounted and moved together with the optical pickup device 4 along the diameter direction of the optical disk 2 and a transmission mechanism 22 which meshes with the rack 21 to transmit a driving force from a driving motor 34.

Figure 4:
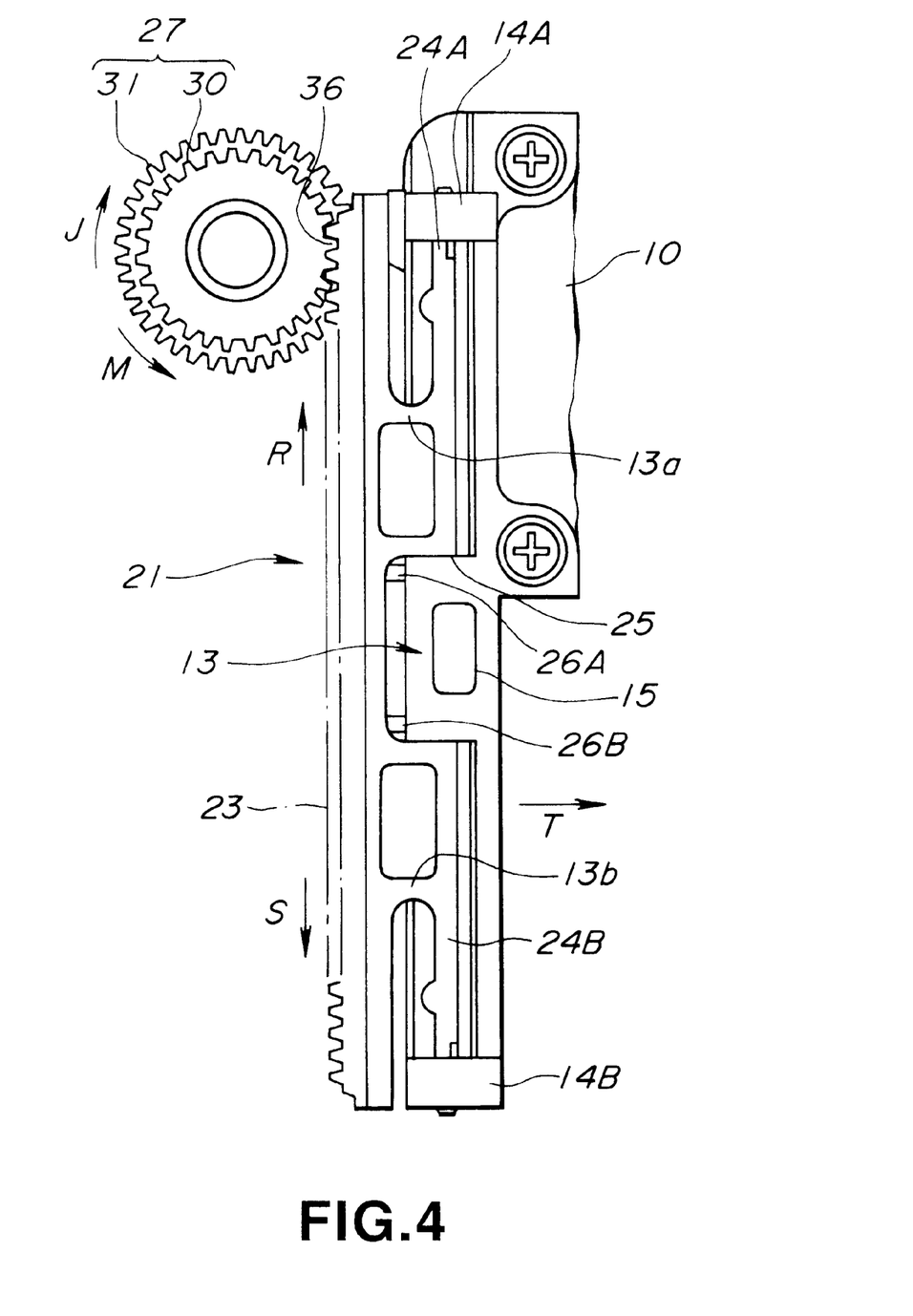
FIG. 4 is a plan view showing a relation between a transmission gear and a rack of the feeding apparatus for the optical pickup device according to an embodiment of the present invention.

As shown in FIG. 4, the rack 21 is installed onto the mounting arm 13 installed on the base 10 of the optical pickup device 4. This rack 21 has a length substantially the same as the length of the mounting arm 13. The rack 21 has a gear section 23 which is provided on a side along a moving direction thereof.

The rack 21 contains elastic deformation arms 24A, 24B which are located on the other side and on both ends along the moving direction and which urge the gear section 23 in such a direction as to engage with the transmission mechanism 22. Front ends of the elastic deformation arms 24A, 24B are inserted into the through holes provided in the supporting portions 14A, 14B mounted on the mounting arm 13 such that the elastic deformation arms 24A, 24B are supported. The elastic deformation arms 24A, 24B are formed of synthetic resin integrally with the gear section 23 such that they are substantially in parallel to the gear section 23 of the rack 21. The elastic deformation arms 24A, 24B are connected with the gear section 23 through connecting portions 13a, 13b with a predetermined gap.

The rack 21 has a guide groove 25 which is located on the other side and in the center along the moving direction and provided with a pair of protruding pieces 26A, 26B inside thereof. With a guide protruding portion 15 of the mounting arm 13 entered into the guide groove 25 and the protruding pieces 26A, 26B of the guide groove 25 supported by groove portions in the guide protruding portion 15 of the mounting arm 13, the rack 21 is movable in a direction in which it meshes with the transmission mechanism 22.

As shown in FIG. 3, the transmission mechanism 22 includes a first transmission gear 27 for moving the rack 21, a second transmission gear 28 for rotating the first transmission gear 27 and a worm gear 29 for rotating the second transmission gear 28.

As shown in FIG. 4, the first transmission gear 27 includes an upper gear section 30 and a lower gear section 31, which are integrally overlapped around the same rotating shaft. The upper gear section 30 of the first transmission gear 27 meshes with the gear section 23 of the rack 21. As shown in FIG. 3, the second transmission gear 28 includes an upper gear section 32 and a lower gear section 33, which are integrally overlapped around the same rotating shaft. The upper gear section 32 of the second transmission gear 28 meshes with the lower gear section 31 of the first transmission gear 27. The worm gear 29 meshes with the lower gear section 33 of the second transmission gear 28. The worm gear 29 is fixed to an output shaft 35 of the driving motor 34.

In the feeding apparatus for the optical pickup device having the above described structure, if the optical disk 2 is placed on the disk table of the disk rotating mechanism 3, a control signal from a control section (not shown) is supplied to the driving motor 34 and then the driving motor 34 in the moving mechanism starts to rotate. The control signal from the control section is output if it is detected that a lid for covering over the optical pickup device 4 or the rotating mechanism 3 of the reproduction apparatus has been closed or that a tray for carrying the optical disk has reached a predetermined position in the reproduction apparatus.

In the feeding apparatus 1, when moving the optical pickup device 4 toward a central hole in the optical disk 2, the driving motor 34 is driven to rotate the worm gear 29 in a direction indicated by the arrow H in FIG. 3. If this worm gear 29 is rotated in the direction indicated by the arrow H, the second transmission gear 28 is rotated in a direction indicated by the arrow I in FIG. 3. If the second transmission gear 28 is rotated in the direction indicated by the arrow I, the first transmission gear 27 is rotated in a direction indicated by the arrow J in FIG. 3. If the first transmission gear 27 is rotated in the direction indicated by the arrow J, the rack 21 is moved in a direction indicated by the arrow S in FIG. 4.

If the rack 21 is moved in the direction indicated by the arrow S in FIG. 4, the optical pickup device 4 is moved along a pair of the guide shafts 19A, 19B in the direction indicated by the arrow S in FIGS. 3, 4. Consequently, the optical pickup device 4 is moved toward the central hole in the optical disk 2 by the rack 21. The rack 21 is moved within a range determined by the guide opening portion 17 provided on the chassis 16 of the optical pickup device 4.

In the feeding apparatus 1, when moving the optical pickup device 4 to the outermost peripheral portion 6 of the optical disk 2, the driving motor 34 is activated so as to rotate the worm gear 29 in a direction indicated by the arrow K. If the worm gear 29 is rotated in the direction indicated by the arrow K, the second transmission gear 28 which meshes with the worm gear 29 is rotated in a direction indicated by the arrow L in FIG. 3. If the second transmission gear 28 is rotated in the direction indicated by the arrow L, the first transmission gear 27 is rotated in a direction indicated by the arrow M in FIG. 3. If the first transmission gear 27 is rotated in a direction indicated by the arrow M, the rack 21 is moved in a direction indicated by the arrow R in FIG. 4.

If the rack 21 is moved in the direction indicated by the arrow R, the optical pickup device 4 is moved along the pair of guide shafts 19A, 19B in a direction indicated by the arrow R in FIGS. 3, 4. As a result, the optical pickup device 4 is moved to the outermost peripheral portion of the optical disk 2 by means of the rack 21. The rack 21 moves the optical pickup device 4 toward the innermost peripheral portion 7 of the optical disk 2. Further, the rack 21 moves the optical pickup device 4 within a range determined by the guide opening portion 17 provided in the chassis 16.

When the driving motor 34 is activated, a driving force of the driving motor 34 is transmitted to the rack 21 through the second transmission gear 28 and the first transmission gear 27. When the rack 21 starts moving, the gear section 23 meshes with teeth 36 of the upper gear section 30 of the first transmission gear 27 and is moved in the direction indicated by the arrow R in FIG. 4.

Figure 5:
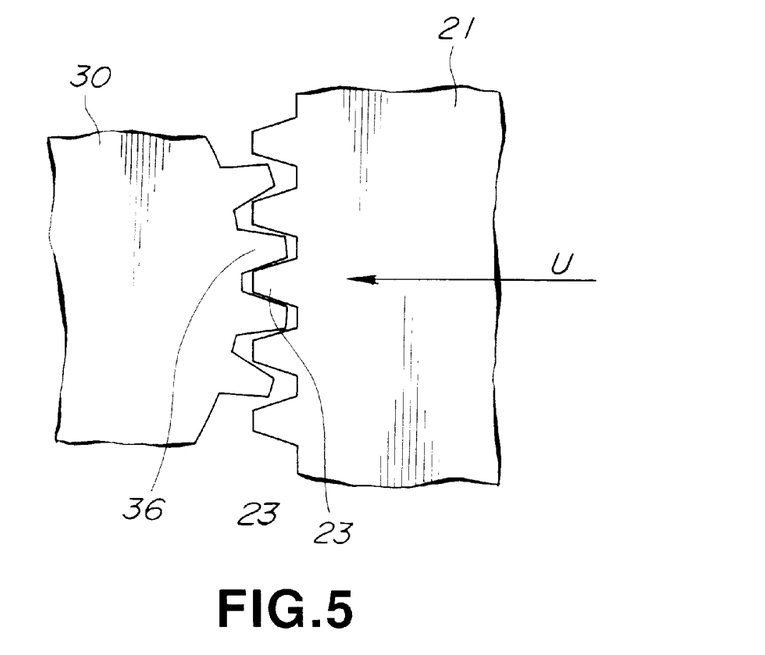
FIG. 5 is a view showing a state in which the transmission gear meshes with the rack in the feeding apparatus for the optical pickup device according to an embodiment of the present invention.

As shown by the arrow U in FIG. 5, the rack 21 is urged by the elastic forces of the elastic deformation arms 24A, 24B such that the gear section 23 meshes with the first transmission gear 27. As a result, the gear section 23 of the rack 21 is pressed to the upper gear section 30 of the first transmission gear 27. Thus, as shown in FIG. 5, the gear section 23 of the rack 21 completely meshes with the teeth 36 of the upper gear section 30 of the first transmission gear 27 such that there occurs no backlash which is a gap along a pitch circle relative to the teeth 36 of the upper gear section 30 of the first transmission gear 27. The rack 21 is moved securely when the upper gear section 30 of the first transmission gear 27 rotates.

Figure 6:
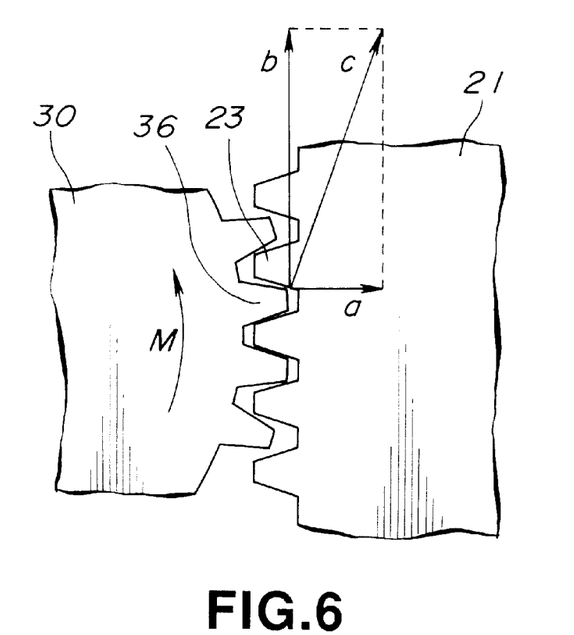
FIG. 6 is a diagram for explaining a relation of forces applied to the rack in a state in which the transmission gear meshes with the rack in the feeding apparatus for the optical pickup device according to an embodiment of the present invention.

If the optical pickup device 4 moves to the innermost peripheral portion 7 or the outermost peripheral portion 6 of the optical disk 2, it comes into contact with the guide walls 18A, 18B of the chassis 16 and stops. At this time, if the driving motor 34 continues to rotate, a driving force of the driving motor 34 is applied to the rack 21 as an excessive transmission force indicated by the arrow C in FIG. 6 through the first and second transmission gears 27, 28. Then, because the gear section 23 of the rack 21 meshes with the teeth 36 of the upper gear section 30 of the first transmission gear 27, the rack 21 is about to be moved in a direction indicated by the arrow b in FIG. 6. Thus, because the gear section 23 of the rack 21 is given a force to move it in a direction indicated by the arrow a in FIG. 6, the gear section 23 is moved in such a direction to disengage from the first transmission gear 27 thereby protecting teeth of the rack 23 or the transmission gear 27 from being chipped. If the gear section 23 is moved in the direction indicated by the arrow a, the elastic deformation arms 24A, 24B are deformed so that urging force is stored so as to absorb an excessive transmission force given to the rack 21 from the upper gear section 30 of the first transmission gear 27. For example, if a shock is applied to the optical pickup device 4 because of a disturbance when the feeding apparatus 1 is stopped, the gear section 23 of the rack 21 is deformed in terms of elasticity, thereby protecting the gear tooth from being chipped. That is, if the driving motor 34 stops rotating, a movement of the rack 21 in a direction indicated by the arrow R or S in FIG. 4 is stopped. With this condition, assume that a shock is applied to the optical pickup device 4 and then the rack 21 is about to be moved in a direction indicated by the arrow R in FIG. 4. At this time, when the gear section 23 is stopped, the rack 21 is supplied with a resistance from the teeth 36 of the upper gear section 30 of the first transmission gear 27, that is, the aforementioned force in the direction of the arrow b in FIG. 6. Thus, the force indicated by the arrow a in FIG. 6 is applied to the rack 21, so that the gear section 23 is moved in a direction indicated by the arrow T in FIG. 4 or in such a direction to leave the first transmission gear 27. At this time, as in the above described case, the elastic deformation arms 24A, 24B are deformed in terms of elasticity to store the urging force thereby absorbing a load applied to the first transmission gear 27.

In the feeding apparatus 1 for the optical pickup device as described above, when the rack 21 starts being moved by a driving force of the driving motor 34, the gear section 23 is deformed in terms of elasticity so that the rack 21 is moved in such a direction to leave the first transmission gear 27. Thus, the rack 21 absorbs a suddenly transmitted force applied by the upper gear section 30 of the first transmission gear 27. As a result, the optical pickup device 4 is prevented from being moved suddenly in the diameter direction of the optical disk 2 thereby preventing the optical pickup device 4 from striking the guide walls 18A, 18B of the chassis 16.

In the feeding apparatus 1 for the optical pickup device according to the present invention, because the gear section 23 is urged in such a direction to mesh with the first transmission gear 27 by elastic force of the elastic deformation arms 24A, 24B of the rack 21, a backlash 55 is prevented from being caused between the gear section 23 of the rack 21 and the teeth 36 of the upper gear section 30 of the first transmission gear 27. Thus, the gear section 23 of the rack 21 meshes with the teeth 36 of the upper gear section 30 of the first transmission gear 27 securely so that the optical pickup device 4 can be moved securely. That is, it is possible to improve the transmission efficiency.

In the feeding apparatus 1 for the optical pickup device according to the present invention, if the driving motor continues to rotate despite that the optical pickup device 4 is stopped, the gear section 23 of the rack 21 is moved in such a direction to leave the first transmission gear 27, so that an excessive force applied to the rack 21 by the first transmission gear 27 is absorbed thereby preventing the rack 21 and the transmission mechanism 22 or the like from being damaged.

In the feeding apparatus 1 for the optical pickup device, if an external force is applied to the optical pickup device 4 which is then stopped, the gear section 23 of the rack 21 is moved in such a direction to disengage from the teeth 36 of the upper gear section 30 of the first transmission gear 27, thereby preventing the rack, the transmission mechanism and the like from being damaged.

Although the head feeding apparatus according to the present invention has been described above by taking as an example a case in which it is applied to the CD-ROM disk reproduction apparatus, the present invention is not limited to this but can be applied to an optical pickup device of an apparatus for recording and/or recording which conducts recording and/or reproduction in disk shaped recording medium such as optical magnetic disk which enables information signals to be written therein or the like. The present invention is not restricted to the feeding apparatus for the optical pickup device but may be applied to a head feeding mechanism of a magnetic disk apparatus.

Although a pair of elastic deformation arms are formed on both ends of the rack according to the aforementioned embodiment, it is permissible to form an elastic deformation arm on at least one side.

The head feeding apparatus of the present invention may be modified in various types within a range not largely departing from a spirit thereof.

What is claimed is:

1. A head feeding apparatus comprising a guide mechanism for guiding a head in a direction of a diameter of a disk shaped recording medium and a moving mechanism for moving said head along said guide mechanism, said moving mechanism including a driving source, a rack and a transmission mechanism, said rack being moved together with said head, said transmission mechanism engaging with said rack to transmit a driving force from said driving source, said rack further containing elastic deformation section for urging a gear section of said rack toward said transmission mechanism, said elastic deformation section being H-shaped having open ends in an elongated direction and formed to deform in a plane including said elongated direction and into a void defined in said elastic deformation section, wherein at least one end of said gear section of said rack is formed to be elastically deformable in such a direction that said gear section is disengaged from said transmission mechanism.

2. A head feeding apparatus comprising a base in which a head is mounted, a guide mechanism for guiding said base in a direction of a diameter of a disk shaped recording medium, and a moving mechanism for moving said head along said guide mechanism, said moving mechanism including a driving source, a rack and a transmission mechanism, said rack being moved together with said head mounted to said base, said transmission mechanism containing transmission gears which engage with a gear section of said rack to transmit a driving force of said driving source to said rack, and said rack further containing a plurality of elastic deformation sections for urging the gear section of said rack toward said transmission gear, said elastic deformation section being H-shaped having open ends in an elongated direction and formed to deform in a plane including said elongated direction and into a void defined in said elastic deformation section, wherein at least one end of said gear section of said rack is elastically deformable in such a direction that said gear section is disengageable from said transmission mechanism.

3. A head feeding apparatus comprising a guide mechanism for guiding a head in a direction of a diameter of a disk shaped recording medium and a moving mechanism for moving said head along said guide mechanism, said moving mechanism including a driving source, a rack and a transmission mechanism, said rack being moved together with said head, said transmission mechanism engaging with said rack to transmit a driving force from said driving source, said rack further containing an elastic deformation section for urging a gear section of said rack toward said transmission mechanism, wherein said gear section of said rack is H-shaped having open ends in an elongated direction and formed to deform in a plane including said elongated direction and open at outermost portions along said elongated direction of said rack and formed to be elastically deformable in such a direction that said gear section is disengaged from said transmission mechanism.

4. A head feeding apparatus comprising a base in which a head is mounted, a guide mechanism for guiding said base in a direction of a diameter of a disk shaped recording medium, and a moving mechanism for moving said head along said guide mechanism, said moving mechanism including a driving source, a rack and a transmission mechanism, said rack being moved together with said head mounted to said base, said transmission mechanism containing transmission gears which engage with a gear section of said rack to transmit a driving force of said driving source to said rack, and said rack further containing a plurality of elastic deformation sections for urging the gear section of said rack toward said transmission gear, wherein said gear section of said rack is H-shaped having open ends in an elongated direction and formed to deform in a plane including said elongated direction and open at outermost portions along said elongated direction of said rack and elastically deformable in such a direction that said gear section is disengageable from said transmission mechanism.

5. A head feeding apparatus comprising a guide mechanism for guiding a head in a direction of a diameter of a disk shaped recording medium and a moving mechanism for moving said head along said guide mechanism, said moving mechanism including a driving source, a rack and a transmission mechanism, said rack having a plurality of teeth all of which are at a substantially same height, said rack being moved together with said head, said transmission mechanism engaging with said rack to transit a driving force from said driving source, said rack further containing an elastic deformation section for urging a gear section of said rack toward said transmission mechanism, wherein said gear section of sad rack is H-shaped having open ends in an elongated direction and formed to deform in a plane including said elongated direction and formed to be elastically deformable in such a direction that said gear section is disengaged from said transmission mechanism.

6. The head feeding apparatus of claim 5, wherein said elastic deformation section is formed to deform into a void defined in said elastic deformation section.

7. A head feeding apparatus comprising a base in which a head is mounted, a guide mechanism for guiding said base in a direction of a diameter of a disk shaped recording medium, and a moving mechanism for moving said head along said guide mechanism, said moving mechanism including a driving source, a rack and a transmission mechanism, said rack having a plurality of teeth all of which are at a substantially same height, said rack being moved together with said head mounted to said base, said transmission mechanism containing transmission gears which engage with a gear section of said rack to transmit a driving force of said driving source to said rack, and said rack further containing a plurality of elastic deformation sections for urging the gear section of said rack toward said transmission gear, wherein said gear section of said rack is H-shaped having open ends in an elongated direction and formed to deform in a plane including said elongated direction and elastically deformable in such a direction that said gear section is disengageable from said transmission mechanism.

8. The head feeding apparatus of claim 7, wherein said elastic deformation section is formed to deform into a void defined in said elastic deformation section.

9. A head feeding apparatus as claimed in any of claims 1, 3 or 5–6, wherein said elastic deformation section comprises one or more arm portions formed integrally with the gear section of said rack on at least one end of said rack.

10. A head feeding apparatus as claimed in any of claims 1, 3 or 5–6, wherein said elastic deformation section comprises one or more arm portions formed to be substantially parallel to the gear section of said rack and have a predetermined gap relative thereto.

11. A head feeding apparatus as claimed in any of claims 1, 3 or 5–6, wherein both ends of the gear section of said rack are formed to be elastically deformable in such a direction that said both ends are disengaged from said transmission mechanism.

12. A head feeding apparatus as claimed in claim 11, wherein said elastic deformation section comprises a pair of arm portions each formed integrally with the gear section of said rack on said both ends of said rack.

13. A head feeding apparatus as claimed in claim 11, wherein said elastic deformation section comprises a pair of arm portions each formed to be substantially parallel to the gear section of said rack and have a predetermined gap relative thereto.

14. A head feeding apparatus as in any of claims 1, 3 or 5–6, wherein said gear section is elastically deformed such that said gear section disengages from said transmission mechanism, when said rack starts being moved by a driving force from said driving source.

15. A head feeding apparatus as in any of claims 1, 3 or 5–6, wherein said gear section is elastically deformed such that said gear section disengages from said transmission mechanism, when an external force is applied to the head feeding apparatus.

16. A head feeding apparatus as in any of claims 1, 3 or 5–6, wherein said gear section is elastically deformed such that said gear section disengages from said transmission mechanism, when said head is contacting a guide wall of a chassis at one of an innermost portion and an outermost portion of said disk shaped recording medium and a driving force from said driving source is transmitted to the rack in the direction of said guide wall.

17. A head feeding apparatus as claimed in any of claims 2, 4 or 7–8, wherein at least one end of the gear section of said rack is formed to be elastically deformable in such a direction that said gear section is disengaged from said transmission gear.

18. A head feeding apparatus as claimed in claim 17 wherein said plurality of elastic deformation sections urge the gear section of said rack in such a direction that the gear section of said rack is engaged with said transmission gear and further in such a direction that said head is fed by said moving mechanism.

19. A head feeding apparatus as claimed in any of claims 2, 4 or 7–8, wherein said elastic deformation sections each comprise one or more arm portions formed integrally with the gear section of said rack on at least one end of said rack.

20. A head feeding apparatus as claimed in any of claims 2, 4 or 7–8, wherein said plurality of elastic deformation sections each comprise one or more arm portions connected with the gear section of said rack and formed to be substantially parallel to the gear section of said rack and have a predetermined gap relative thereto.

21. A head feeding apparatus as claimed in any of claims 2, 4 or 7–8, wherein both ends of the gear section of said rack are formed to be elastically deformable in such a direction that said both ends are disengaged from said transmission mechanism.

22. A head feeding apparatus as claimed in claim 21 wherein said elastic deformation sections urge the gear section of said rack in such a direction that the gear section of said rack is engaged with said transmission gear and further in such a direction that said head is fed by said moving mechanism.

23. A head feeding apparatus as claimed in claim 21 wherein said elastic deformation sections comprise a pair of arm portions each formed integrally with the gear section of said rack on both ends of said rack.

24. A head feeding apparatus as claimed in claim 21 wherein said elastic deformation sections comprise a pair of arm portions connected with the gear section of said rack and formed to be substantially parallel to the gear section of said rack and have a predetermined gap relative thereto.

25. A head feeding apparatus as in any of claims 2, 4 or 7–8, wherein said gear section is elastically deformed such that said gear section disengages from said transmission mechanism, when said rack starts being moved by a driving force from said driving source.

26. A head feeding apparatus as in any of claims 2, 4 or 7–8, wherein said gear section is elastically deformed such that said gear section disengages from said transmission mechanism, when an external force is applied to the head feeding apparatus.

27. A head feeding apparatus as in any of claims 2, 4 or 7–8, wherein said gear section is elastically deformed such that said gear section disengages from said transmission mechanism, when said head is contacting a guide wall of a chassis at one of an innermost portion and an outermost portion of said disk shaped recording medium and a driving force from said driving source is transmitted to the rack in the direction of said guide wall.

28. The head feeding apparatus of claim 6, wherein at least one end of said gear section of said rack is U-shaped and open at an outermost portion of said rack.

29. The head feeding apparatus of claim 8, wherein at least one end of said gear section of said rack is U-shaped and open at an outermost portion of said rack.

* * * * *